(12) United States Patent
Kim et al.

(10) Patent No.: US 12,506,834 B2
(45) Date of Patent: *Dec. 23, 2025

(54) ELECTRONIC APPARATUS FOR PROVIDING VOICE RECOGNITION CONTROL AND OPERATING METHOD THEREFOR

(71) Applicant: SAMSUNG ELECTRONICS CO., LTD., Suwon-si (KR)

(72) Inventors: Kwang-Youn Kim, Seoul (KR); Won-Nam Jang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 4 days.

This patent is subject to a terminal disclaimer.

(21) Appl. No.: 18/528,013

(22) Filed: Dec. 4, 2023

(65) Prior Publication Data

US 2024/0106932 A1    Mar. 28, 2024

Related U.S. Application Data

(63) Continuation of application No. 17/540,108, filed on Dec. 1, 2021, now Pat. No. 11,838,445, which is a
(Continued)

(30) Foreign Application Priority Data

Feb. 25, 2016   (KR) .................. 10-2016-0022722

(51) Int. Cl.
*H04M 3/04* (2006.01)
*G06F 3/04817* (2022.01)
(Continued)

(52) U.S. Cl.
CPC ...... *H04M 3/4938* (2013.01); *G06F 3/04817* (2013.01); *G06F 3/0482* (2013.01);
(Continued)

(58) Field of Classification Search
CPC ......... G06F 17/30663; G06F 17/30899; G06F 3/0482; G06F 3/017; G06F 3/0487;
(Continued)

(56) References Cited

U.S. PATENT DOCUMENTS 9,009,053 B2   4/2015   Burke
9,105,269 B2   8/2015   Lebeau
(Continued)

FOREIGN PATENT DOCUMENTS

JP   2003-227729       8/2003
KR   10-2010-0047719   5/2010
(Continued)

OTHER PUBLICATIONS

Office Action dated Jun. 12, 2024 in Korean Patent Application No. 10-2016-0022722 and English-language translation.
(Continued)

*Primary Examiner* — Khawar Iqbal
(74) *Attorney, Agent, or Firm* — Nixon & Vanderhye, P.C.

(57) ABSTRACT

An example electronic apparatus for providing voice recognition control includes a display; and a processor, wherein the processor may be configured to obtain a content including at least one object; distinguish the at least one object within the content; display an instruction text in correspondence with a non-text object among the at least one object; and select the non-text object corresponding to the instruction text if a voice command corresponding to the instruction text is inputted.

15 Claims, 13 Drawing Sheets

Related U.S. Application Data continuation of application No. 16/696,459, filed on Nov. 26, 2019, now Pat. No. 11,218,592, which is a continuation of application No. 16/079,708, filed as application No. PCT/KR2017/001994 on Feb. 23, 2017, now Pat. No. 10,542,144.

(51) Int. Cl.

| | | |
|---|---|---|
| *G06F 3/0482* | (2013.01) | |
| *G06F 3/04842* | (2022.01) | |
| *G06F 3/0487* | (2013.01) | |
| *G06F 3/16* | (2006.01) | |
| *G06F 16/3332* | (2025.01) | |
| *G06F 16/957* | (2019.01) | |
| *G10L 15/22* | (2006.01) | |
| *H04M 1/72* | (2021.01) | |
| *H04M 3/493* | (2006.01) | |
| *G10L 15/28* | (2013.01) | |
| *H04M 1/72445* | (2021.01) | |

(52) U.S. Cl.
CPC ........ *G06F 3/04842* (2013.01); *G06F 3/0487* (2013.01); *G06F 3/167* (2013.01); *G06F 16/3334* (2019.01); *G06F 16/957* (2019.01); *G10L 15/22* (2013.01); *G10L 15/28* (2013.01); *H04M 1/72445* (2021.01)

(58) Field of Classification Search
CPC . G06F 3/167; G06F 3/03; G06F 9/453; G06F 16/957; G06F 16/3334; G06F 3/04817; G06F 3/04842; G10L 15/02; G10L 15/07; G10L 15/22; G10L 15/265; G10L 15/28; H04M 1/72561; H04M 3/4938; G06T 19/006
See application file for complete search history.

(56) References Cited

U.S. PATENT DOCUMENTS

| | | | |
|---|---|---|---|
| 9,129,011 B2 | 9/2015 | Yang | |
| 9,430,186 B2 | 8/2016 | Faaborg | |
| 9,824,188 B2 | 11/2017 | Brown | |
| 9,836,192 B2 * | 12/2017 | Katsuranis | G06F 3/0484 |
| 10,127,011 B2 | 11/2018 | Bang | |
| 10,170,099 B2 | 1/2019 | Cho | |
| 10,347,246 B2 | 7/2019 | Lee | |
| 10,395,657 B2 | 8/2019 | Cho | |
| 10,409,851 B2 | 9/2019 | Huang | |
| 10,542,144 B2 | 1/2020 | Kim et al. | |
| 10,983,654 B2 | 4/2021 | Brown | |
| 11,218,592 B2 | 1/2022 | Kim et al. | |
| 2010/0105364 A1 * | 4/2010 | Yang | G06F 3/167 |
| | | | 704/235 |
| 2013/0179173 A1 | 7/2013 | Lee et al. | |
| 2013/0231937 A1 | 9/2013 | Woodall et al. | |
| 2013/0232437 A1 | 9/2013 | Kim | |
| 2013/0239000 A1 | 9/2013 | Parkinson | |
| 2014/0189518 A1 | 7/2014 | Kim | |
| 2014/0195243 A1 * | 7/2014 | Cha | G06F 3/167 |
| | | | 704/270.1 |
| 2014/0223273 A1 | 8/2014 | Chung | |
| 2015/0040012 A1 | 2/2015 | Faaborg et al. | |
| 2015/0106090 A1 * | 4/2015 | Choi | G10L 15/28 |
| | | | 704/235 |
| 2015/0161217 A1 | 6/2015 | Zhang | |
| 2015/0213799 A1 * | 7/2015 | Han | G10L 15/26 |
| | | | 704/235 |
| 2015/0278355 A1 | 10/2015 | Hassanpour | |
| 2015/0309682 A1 | 10/2015 | Lee | |
| 2015/0317837 A1 | 11/2015 | Sholudko et al. | |
| 2015/0339098 A1 | 11/2015 | Lee | |
| 2016/0062561 A1 | 3/2016 | Chandrasekaran | |
| 2016/0217109 A1 | 7/2016 | Stacho | |
| 2016/0306860 A1 | 10/2016 | Spector | |
| 2016/0307575 A1 * | 10/2016 | Cha | H04N 21/4828 |
| 2016/0321302 A1 | 11/2016 | Flynn | |
| 2016/0350825 A1 | 12/2016 | Hertschuh | |
| 2017/0026686 A1 | 1/2017 | Glazier | |
| 2017/0084273 A1 * | 3/2017 | Zohar | G10L 15/26 |
| 2017/0102832 A1 | 4/2017 | Sivaraj | |
| 2017/0177171 A1 * | 6/2017 | Won | G06F 3/04883 |
| 2017/0257470 A1 * | 9/2017 | Youn | H04M 1/72448 |
| 2017/0264939 A1 | 9/2017 | Jang | |
| 2017/0278020 A1 | 9/2017 | Noe | |
| 2018/0136904 A1 | 5/2018 | Kim | |
| 2018/0182395 A1 * | 6/2018 | Zohar | G06F 3/167 |
| 2018/0329728 A1 | 11/2018 | Kim | |
| 2018/0356961 A1 | 12/2018 | Lewis | |
| 2019/0053731 A1 | 2/2019 | Moon | |
| 2019/0057702 A1 * | 2/2019 | Choi | G10L 15/28 |
| 2019/0318545 A1 * | 10/2019 | Sholudko | G06F 3/16 |
| 2020/0150842 A1 | 5/2020 | Vida | |
| 2020/0174630 A1 | 6/2020 | Rosenberg | |
| 2020/0302935 A1 | 9/2020 | Choi | |

FOREIGN PATENT DOCUMENTS

| | | |
|---|---|---|
| KR | 10-2013-0082339 | 7/2013 |
| KR | 10-2014-0089861 | 7/2014 |
| KR | 10-2015-0027163 | 3/2015 |
| KR | 10-2015-0089145 | 8/2015 |
| KR | 10-2015-0125472 | 11/2015 |

OTHER PUBLICATIONS

International Search Report for PCT/KR2017/001994 dated May 25, 2017, 6 pages.

Office Action dated Oct. 13, 2023 in Korean Patent Application No. 10-2016-0022722 and English-language translation.

Kim et al, U.S. Appl. No. 16/079,708, filed Aug. 24, 2018, now U.S. Pat. No. 10,542,144.

Kim et al, U.S. Appl. No. 16/696,459, filed Nov. 26, 2019, now U.S. Pat. No. 11,218,592.

Kim et al, U.S. Appl. No. 17/540,108, filed Dec. 1, 2021.

* cited by examiner

610b

Related search: Galaxy S6 Galaxy Note 4 Galaxy S6 Release Date iPphone 6

Help: Only search results in Korean are displayed. Configure...

680 — Samsung Galaxy S6 Preview - CNET
www.cnet.com/products/samsung-glaxy-s6/ Translate this page
2015 3 1 - Everything you need to know about the Samsung Galaxy S6.including impressions and anaysis, photos, video....
Could this be Samsung;s - Tone-deaf shockingly sexist - Samsung Galaxy A5

News

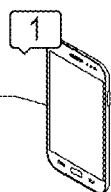

"Galaxy S6 and S6 Edge will be released in 830,000 and 950,000 Korean won price range"
Electronic Times - 15 hours ago
670 — 32 GB Galaxy S6 will be released worldwide on the tenth of the next month for about 830,000 Korean won
32 GB Galaxy S6 Edge will be 950,000 Korean won More news for Galaxy S6

Images for Galaxy S6

670    670    670    670

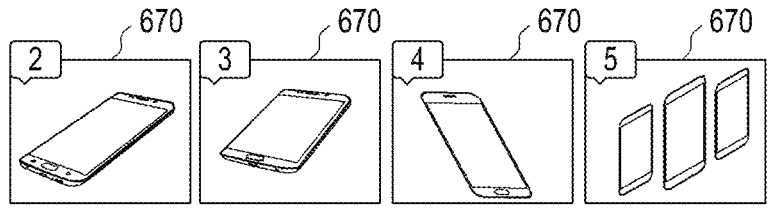

More images for Galaxy S6

Related search: Galaxy S6 Galaxy Note 4 Galaxy S6 Release Date iPphone 6

Help: Only search results in Korean are displayed. Configure...

Samsung Galaxy S6 Preview - CNET
www.cnet.com/products/samsung-glaxy-s6/ Translate this page
2015 3 1 - Everything you need to know about the Samsung Galaxy S6.including impressions and anaysis, photos, video....
Could this be Samsung;s - Tone-deaf shockingly sexist - Samsung Galaxy A5

News 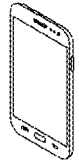  "Galaxy S6 and S6 Edge will be released in 830,000 and 950,000 Korean won price range" ~881

Electronic Times - 15 hours ago
32 GB Galaxy S6 will be released worldwide on the tenth of the next month for about 830,000 Korean won
32 GB Galaxy S6 Edge will be 950,000 Korean won More news for Galaxy S6

Images for Galaxy S6

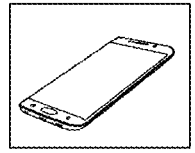 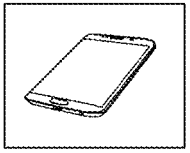 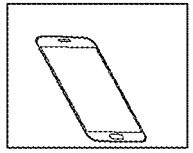 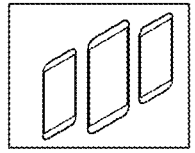

More images for Galaxy S6

FIG.8A

ELECTRONIC APPARATUS FOR PROVIDING VOICE RECOGNITION CONTROL AND OPERATING METHOD THEREFOR

CROSS-REFERENCE TO RELATED APPLICATIONS

This application is a continuation application of U.S. patent application Ser. No. 17/540,108, filed Dec. 1, 2021, now U.S. Pat. No. 11,838,445, which is a continuation application of U.S. application Ser. No. 16/696,459, filed Nov. 26, 2019, now U.S. Pat. No. 11,218,592, which is a continuation of U.S. patent application Ser. No. 16/079,708, filed on Aug. 24, 2018, now U.S. Pat. No. 10,542,144, which is the national stage of International Application No. PCT/KR2017/001994, filed on Feb. 23, 2017, which designated the U.S., which is based on and claims priority under 35 U.S.C. § 119 to Korean Patent Application No. 10-2016-0022722, filed on Feb. 25, 2016. The entire contents of each of these applications are hereby incorporated by reference.

BACKGROUND

1. Field

Various embodiments of the present disclosure relate to an electronic device providing a voice control function, and an operating method thereof.

2. Description of Related Art

A user interface is technology for providing temporary or continuous access to enable communication between a user and an object, a system, a device, or a program.

In recent years, as a user interface, voice recognition control techniques for controlling electronic devices using a sound uttered by a user have been studied. A voice recognition control technique may be implemented by registering instructions to be used for voice control by an application or a service developer in advance and by defining voice recognition results and actions according to resulting actions.

SUMMARY

An electronic device employing a voice recognition control technique may provide a function or an operation corresponding to a voice command. However, a conventional voice recognition control technique enables control by a voice command established in advance but has difficulty in establishing data for a document-type content, such as a web page, by associating a voice command and a functional operation in advance.

Various embodiments of the present disclosure may provide an electronic device and an operating method thereof for providing voice recognition control that enables the selection and execution of a particular object of content using voice recognition by analyzing a resource of content configured with part of a standardized document displayed on an electronic device, such as a web page or a GUI toolkit (FEL-EDJE or the like), and by displaying an object, which is not selectable by voice recognition, with an assigned instruction text.

According to various embodiments of the present disclosure, an electronic device may include: a display; and a processor, wherein the processor may be configured to: obtain content including at least one object; distinguish the at least one object within the content; display an instruction text corresponding to a non-text object among the at least one object; and select the non-text object corresponding to the instruction text when a voice command corresponding to the instruction text is input.

According to various embodiments of the present disclosure, an operating method of an electronic device may include: obtaining content including at least one object; distinguishing the at least one object within the content; displaying an instruction text corresponding to a non-text object among the at least one object; and selecting the non-text object corresponding to the instruction text when a voice command corresponding to the instruction text is input.

According to various embodiments of the present disclosure, a computer recording medium may store an instruction that is executed by at least one processor and is readable by a computer, wherein the instruction may be configured to perform: obtaining content including at least one object; distinguishing the at least one object within the content; displaying an instruction text corresponding to a non-text object among the at least one object; and selecting the non-text object corresponding to the instruction text when a voice command corresponding to the instruction text is input.

According to various embodiments of the present disclosure, it is possible to provide voice recognition control that enables the selection and execution of a particular object using only voice recognition, without any input tool, by analyzing a resource of content configured with part of a standardized document, such as a web page or a GUI toolkit (FEL-EDJE or the like), and by displaying an object, which is not selectable by voice recognition, with an assigned instruction text.

BRIEF DESCRIPTION OF THE DRAWINGS

FIGS. 6A and 6B show examples for illustrating a method for an electronic device to display a content page according to various embodiments of the present disclosure;

FIGS. 8A and 8B show examples for illustrating a voice recognition control method of an electronic device according to various embodiments of the present disclosure;

DETAILED DESCRIPTION

Figure 1:
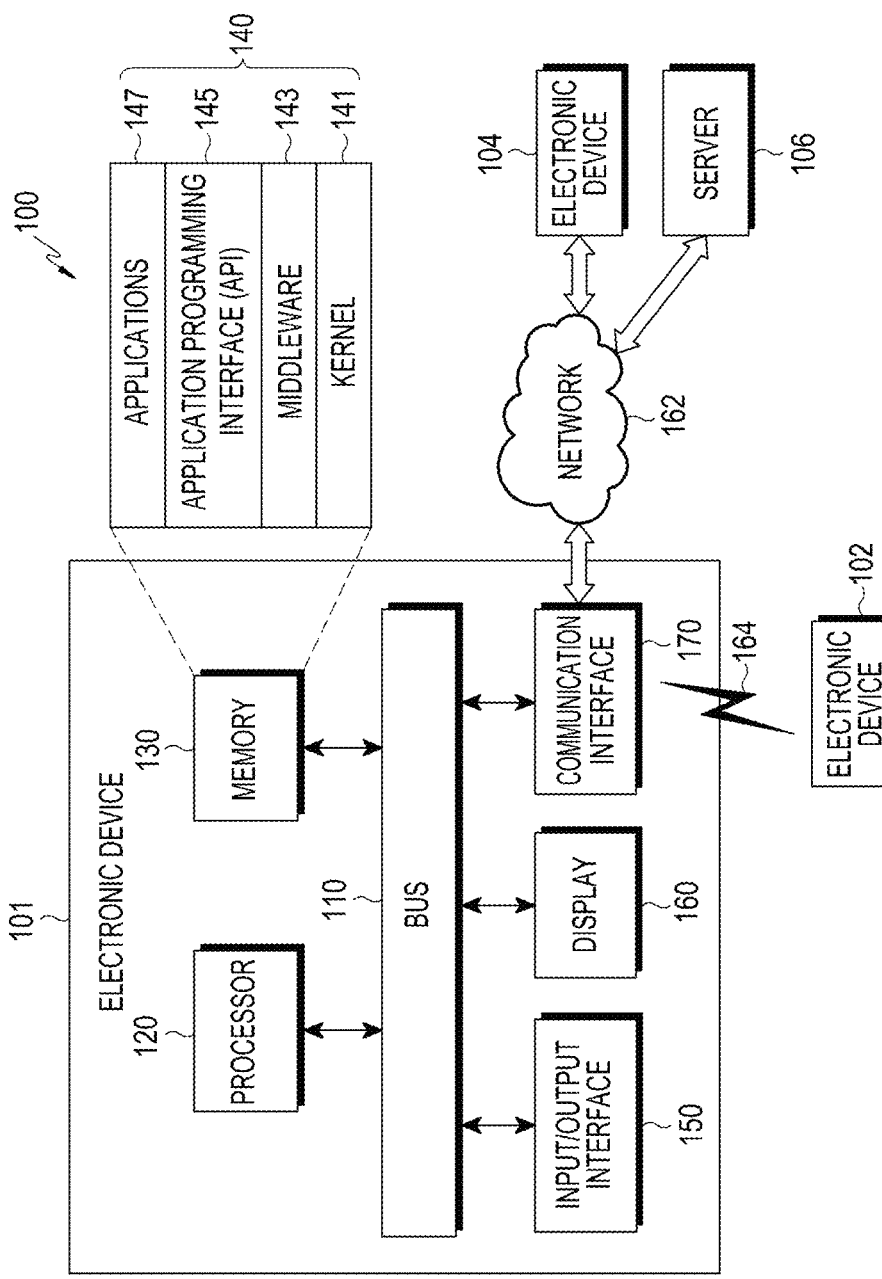
FIG. 1 is a block diagram illustrating an electronic device 101 in a network environment 100 according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 is a block diagram illustrating an electronic device 101 in a network environment 100 according to various embodiments.

Referring to FIG. 1, the electronic device 101 may include a bus 110, a processor 120, a memory 130, an input/output interface 150, a display 160, and a communication interface 170. In some embodiments, at least one of the components may be omitted, or additional components may be further included in the electronic device 101.

The bus 110 may include, for example, a circuit that connects the components to each other and delivers communications (for example, control messages and/or data) between the components.

The processor 120 may include one or more of a Central Processing Unit (CPU), an Application Processor (AP), and a Communication Processor (CP). The processor 120 may control, for example, at least one different component of the electronic device 101, and/or may perform operations relating to communication or data processing.

The memory 130 may include a volatile and/or nonvolatile memory. The memory 130 may store, for example, a command or data related to at least one different component of the electronic device 101. According to one embodiment, the memory 130 may store software and/or a program 140. The program 140 may include, for example, a kernel 141, middleware 143, an Application Programming Interface (API) 145, and/or an application (or "app") 147. At least part of the kernel 141, the middleware 143, and the API 145 may be designated as an Operating System (OS).

The kernel 141 may control or manage system resources (for example, the bus 110, the processor 120, the memory 130, or the like) used to perform an operation or function implemented in other programs (for example, the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data.

Further, the middleware 143 may process one or more requests for operations received from the application 147 according to the priority thereof. For example, the middleware 143 may assign at least one application 147 priority for using system resources of the electronic device 101 (for example, the bus 110, the processor 120, the memory 130, or the like). For example, the middleware 143 may process the one or more requests for operations according to the priority assigned to the at least one application, thereby performing scheduling or load balancing for the one or more requests for operations.

The API 145 is, for example, an interface for the application 147 to control a function provided from the kernel 141 or the middleware 143, and may include, for example, at least one interface or function (for example, a command) for file control, window control, image processing, or text control.

The input/output interface 150 may serve as an interface that delivers a command or data, which is input from, for example, a user or a different external device, to a different component(s) of the electronic device 101. Further, the input/output interface 150 may output a command or data, which is received from a different component(s) of the electronic device 101, to the user or to the different external device.

The display 160 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 160 may display, for example, various types of content (for example, text, an image, a video, an icon, a symbol, or the like) for the user. The display 160 may include a touch screen and may receive touch, gesture, proximity, or hovering input using, for example, an electronic pen or a body part of a user.

The communication interface 170 may establish communication, for example, between the electronic device 101 and an external device (for example, a first external electronic device 102, a second external electronic device 104, or a server 106). For example, the communication interface 170 may be connected to a network 162 via wireless communication or wired communication to communicate with the external device (for example, the second external electronic device 104 or the server 106).

The wireless communication may use, for example, a cellular communication protocol, which may be, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). Further, the wireless communication may include, for example, short-range communication 164. The short-range communication 164 may include, for example, at least one of Wireless Fidelity (Wi-Fi), Bluetooth, Near-Field Communication (NFC), and Global Navigation Satellite System (GNSS). The GNSS may include, for example, at least one of a Global Positioning System (GPS), a Global Navigation Satellite System (GNSS), a BeiDou Navigation Satellite System (hereinafter, "BeiDou"), and Galileo, which is the European global satellite-based navigation system, depending on the use area or bandwidth. In the present document, "GPS" may be interchangeably used with "GNSS" hereinafter. The wired communication may include, for example, at least one of Universal Serial Bus (USB), High-Definition Multimedia Interface (HDMI), Recommended Standard 232 (RS-232), and Plain Old Telephone Service (POTS). The network 162 may include a telecommunications network, which may be, for example, at least one of a computer network (for example, a Local Area Network (LAN) or Wide Area Network (WAN)), the Internet, and a telephone network.

Each of the first and second external electronic devices 102 and 104 may be a device of a type that is the same as, or different from, that of the electronic device 101. According to one embodiment, the server 106 may include a group of one or more servers. According to various embodiments, all or some of the operations performed in the electronic device 101 may be performed in another electronic device or a plurality of electronic devices (for example, the electronic devices 102 and 104 or the server 106). According to one embodiment, when the electronic device 101 needs to perform a function or service automatically or upon request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional functions and may transmit the result thereof to the electronic device 101. The electronic device 101 may provide the requested function or service using the received result without change or after additionally processing the result. To this end, cloud-computing, distributed-computing, or client-server-computing technologies may be used.

Figure 2:
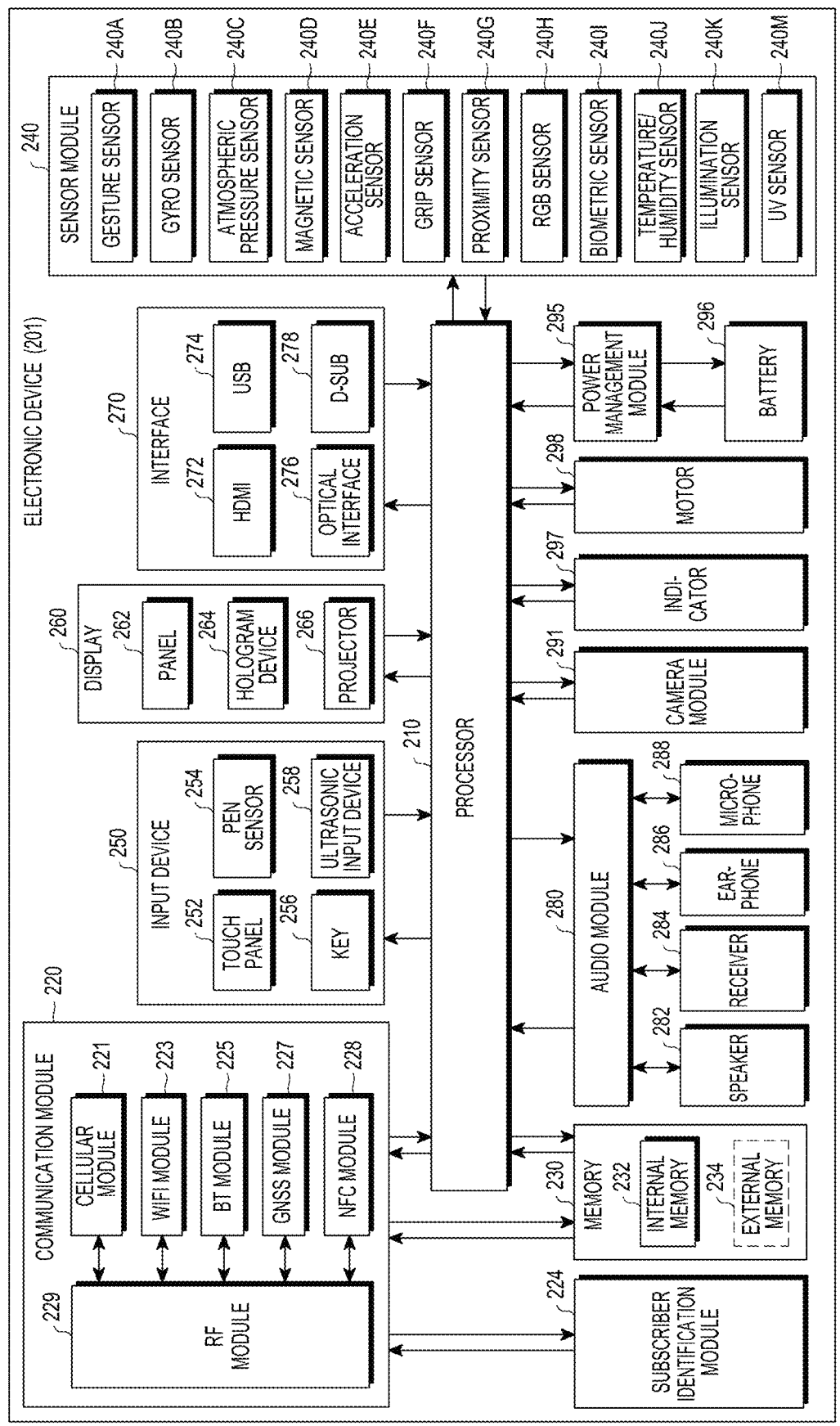
FIG. 2 is a block diagram illustrating an electronic device according to various embodiments.

FIG. 2 is a block diagram illustrating an electronic device according to various embodiments.

The electronic device 201 may include, for example, all or part of the electronic device 101 illustrated in FIG. 1. The electronic device 201 may include one or more processors (for example, Application Processors (APs)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processors 210 may run, for example, an operating system or an application to control a plurality of hardware or software components that are connected to the processors 210, and may perform various kinds of data processing and operations. The processors 210 may be configured as, for example, a System on Chip (SoC). According to one embodiment, the processors 210 may further include a Graphic Processing Unit (GPU) and/or an image signal processor. The processors 210 may include at least some (for example, a cellular module 221) of the components illustrated in FIG. 2. The processors 210 may load a command or data received from at least one of other components (for example, nonvolatile memory) into volatile memory to process the command or data, and may store various types of data in the nonvolatile memory.

The communication module 220 may have a configuration that is the same as, or similar to, that of the communication interface 170 in FIG. 1. The communication module 220 may include, for example, a cellular module 221, a Wi-Fi module 223, a BT module 225, a GNSS module 227, a Near-Field Communication (NFC) module 228, and a Radio Frequency (RF) module 229.

The cellular module 221 may provide, for example, a voice call, a video call, a text messaging service, or an Internet service through a communication network. According to one embodiment, the cellular module 221 may perform identification and authentication of the electronic device 201 in a communication network using a Subscriber Identity Module (SIM, for example, a SIM card) 224. According to one embodiment, the cellular module 221 may perform at least some of the functions provided by the processors 210. According to one embodiment, the cellular module 221 may include a Communication Processor (CP).

The Wi-Fi module 223, the BT module 225, the GNSS module 227, and the NFC module 228 may each include a processor to process data transmitted and received via the respective modules. According to one embodiment, at least some (for example, two or more) of the cellular module 221, the Wi-Fi module 223, the BT module 225, the GNSS module 227, and the NFC module 228 may be included in one Integrated Chip (IC) or IC package.

The RF module 229 may transmit and receive, for example, a communication signal (for example, an RF signal). The RF module 229 may include, for example, a transceiver, a Power Amplifier (amp) Module (PAM), a frequency filter, a Low-Noise Amplifier (LNA), an antenna, or the like. According to another embodiment, at least one of the cellular module 221, the Wi-Fi module 223, the BT module 225, the GNSS module 227, and the NFC module 228 may transmit and receive an RF signal through a separate RF module.

The SIM 224 may include, for example, a card including a SIM and/or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, an NAND flash, an NOR flash, or the like), a hard drive, or a Solid-State Drive (SSD)).

The external memory 234 may further include a flash drive, for example, a Compact Flash (CF), a Secure Digital (SD), a micro Secure Digital (micro-SD), a mini Secure Digital (mini-SD), an extreme digital (xD), a memory stick, or the like. The external memory 234 may be functionally and/or physically connected to the electronic device 201 through any of various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as a part of the APs 210 or separately from the APs 210, to control the sensor module 240, thereby controlling the sensor module 240 while the APs 210 are in a sleep state.

The input device 250 may include, for example, a touch panel 252, a (digital) pen sensor 254, a key 256, or an ultrasonic input device 258. The touch panel 252 may be, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or may include a separate recognition sheet. The key 256 may include, for example, a physical button, an optical key, or a keypad. The ultrasonic input device 258 may detect sound waves via a microphone (for example, a microphone 288) in the electronic device 201 through an input tool that generates an ultrasonic signal and may identify data.

The display 260 (for example, the display 160) may include a panel 262, a hologram device 264, or a projector 266. The panel 262 may have a configuration that is the same as, or similar to, that of the display 160 of FIG. 1. The panel 262 may be configured, for example, to be flexible, transparent, or wearable. The panel 262 may be formed with the touch panel 252 in a single module. The hologram device 264 may display a three-dimensional image in the air using light interference. The projector 266 may project light onto a screen to display an image. The screen may be disposed, for example, inside or outside the electronic device 201. According to one embodiment, the display 260 may further include a control circuit to control the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) interface 278. The interface 270 may be included, for example, in the communication interface 170 illustrated in FIG. 1. Additionally or alternatively, the interface 270 may include, for example, a Mobile High-Definition Link (MHL) interface, a Secure Digital (SD) card/Multi-Media Card (MMC) interface, or an Infrared Data Association (IrDA) interface.

The audio module 280 may bidirectionally convert, for example, a sound and an electrical signal. At least some components of the audio module 280 may be included, for example, in the input/output interface 150 illustrated in FIG. 1. The audio module 280 may process sound information input or output, for example, through a speaker 282, a receiver 284, earphones 286, or the microphone 288.

The camera module 291 is a device that takes, for example, a still image and a video. According to one embodiment, the camera module 291 may include one or more image sensors (for example, a front sensor or a rear sensor), a lens, an Image Signal Processor (ISP), or a flash (for example, an LED, a xenon lamp, or the like).

The power management module 295 may manage, for example, the power of the electronic device 201. According to one embodiment, the power management module 295 may include a Power Management Integrated Circuit (PMIC), a charger Integrated Circuit (IC), or a battery or fuel gauge. The PMIC may have wired and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state. The motor 298 may convert an electrical signal into mechanical vibrations, and may generate vibrations or a haptic effect. Although not shown, the electronic device 201 may include a processing device for supporting a mobile TV (for example, a GPU). The processing device for supporting the mobile TV may process media data in accordance with Digital Multimedia Broadcasting (DMB), Digital Video Broadcasting (DVB), or MediaFlo™ standards.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
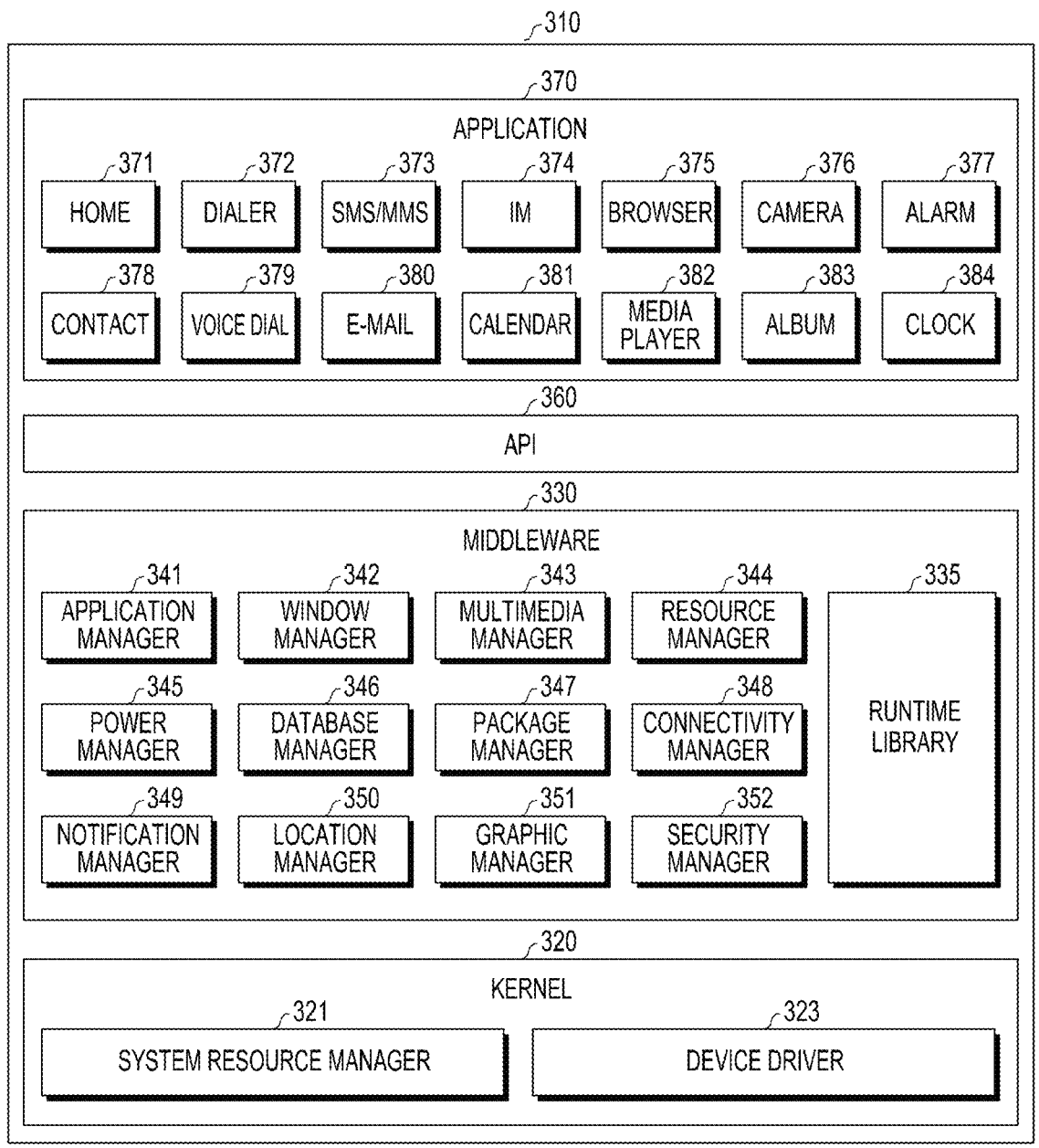
FIG. 3 is a block diagram illustrating a program module according to various embodiments.

FIG. 3 is a block diagram illustrating a program module according to various embodiments.

According to one embodiment, the program module 310 (for example, the program 140) may include an Operating System (OS) that controls resources related to an electronic device (for example, the electronic device 101) and/or various applications (for example, the application 147) that run on the OS. The OS may be, for example, Android, iOS, Windows, Symbian, Tizen, Bada, or the like.

The program module 310 may include a kernel 320, middleware 330, an API 360, and/or an application 370. At least part of the program module 310 may be preloaded onto the electronic device, or may be downloaded from an external electronic device (for example, the electronic device 102 or 104), a server (for example, the server 106), or the like.

The kernel 320 (for example, the kernel 141 of FIG. 1) may include, for example, a system resource manager 321 and/or a device driver 323. The system resource manager 321 may perform control, allocation, or recovery of system resources. According to one embodiment, the system resource manager 321 may include a process management unit, a memory management unit, or a file-system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, functions commonly needed for applications 370, or may provide the applications 370 with various functions through the API 360 so that the applications 370 may efficiently use the limited systems resources in the electronic device. According to one embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function through a programming language while the application 370 is running. The runtime library 355 may perform functions for input/output management, memory management, or arithmetic functions.

The application manager 341 may manage, for example, the life cycle of at least one application among the applications 370. The window manager 342 may manage graphic user interface (GUI) resources used for a screen. The multimedia manager 343 may identify formats that are necessary to play various media files, and may encode or decode a media file using a codec suitable for a corresponding format. The resource manager 344 may manage resources, such as a source code, a memory, or a storage space, for at least one application among the applications 370.

The power manager 345 may operate with, for example, a Basic Input/Output System (BIOS) to manage a battery or power supply and may provide information on power necessary for operation of the electronic device. The database manager 346 may generate, retrieve, or change a database to be used for at least one application among the applications 370. The package manager 347 may install or update an application distributed in the form of a package file.

The connectivity manager 348 may manage wireless connectivity via, for example, Wi-Fi or Bluetooth. The notification manager 349 may display or report an incoming message, an appointment, and an event including a proximity notification in a manner that does not disturb a user. The location manager 350 may manage position information on the electronic device. The graphic manager 351 may manage a graphic effect to be provided for the user or a user interface related to the graphic effect. The security manager 352 may provide overall security functions necessary for system security or user authentication. According to one embodiment, when the electronic device (for example, the electronic device 101) has phone features, the middleware 330 may further include a telephony manager to manage a voice or video call function of the electronic device.

The middleware 330 may include a middleware module that forms combinations of various functions of the foregoing components. The middleware 330 may provide a specialized module for each type of OS in order to provide differentiated functions. Further, the middleware 330 may dynamically delete some of the existing components or add new components.

The API 360 (for example, the API 145) is, for example, a set of API programming functions, and may be provided with a different configuration depending on the OS. For example, one API set for each platform may be provided in the case of Android or iOS, while two or more API sets for each platform may be provided in the case of Tizen.

The application 370 (for example, the application 147) may include one or more applications that are capable of providing functions of, for example, a home screen 371, a dialer 372, SMS/MMS 373, instant messaging (IM) 374, a browser 375, a camera 376, an alarm 377, an address book 378, a voice dialer 379, email 380, a calendar 381, a media player 382, an album 383, a clock 384, or health care (for example, for measuring exercising or blood sugar), an environmental data application (for example, for providing atmospheric pressure, humidity, or temperature data), or the like.

According to one embodiment, the application 370 may include an application (hereinafter, "information exchange application" for convenience of description) that supports information exchange between the electronic device (for example, the electronic device 101) and an external electronic device (for example, the electronic device 102 or 104). The information exchange application may include, for example, a notification relay application for relaying specific information to the external electronic device or a device management application for managing the external electronic device.

For example, the notification relay application may include a function of relaying notification information, which is generated in another application (for example, an SMS/MMS application, an email application, a health care application, an environmental data application, or the like) of the electronic device, to the external electronic device (for example, the electronic device 102 or 104). Additionally, the notification relay application may receive notification information, for example, from the external electronic device and may provide the notification information to the user.

The device management application may manage (for example, install, delete, or update), for example, at least one function (for example, a function of turning on/turning off the external electronic device itself (or some components thereof) or adjusting the brightness (or resolution) of a display) of the external electronic device (for example, the electronic device 102 or 104) communicating with the electronic device, an application operating in the external electronic device, or a service (for example, a call service or message service) provided by the external electronic device.

According to one embodiment, the application 370 may include an application (for example, a health care application of a mobile medical device) assigned according to the attributes of the external electronic device (for example, the electronic device 102 or 104). According to one embodiment, the application 370 may include an application received from the external electronic device (for example, the server 106 or the electronic device 102 or 104). According to one embodiment, the application 370 may include a preloaded application or a third-party application that may be downloaded from a server. The illustrated components of the program module 310, according to the embodiments, may be termed differently depending on the OS.

According to various embodiments, at least part of the program module 310 may be implemented in software, firmware, hardware, or combinations of at least two or more thereof. At least part of the program module 310 may be implemented (for example, run) by, for example, a processor (for example, the processor 120). At least part of the program module 310 may include, for example, a module, a program, a routine, sets of instructions, or a process to perform one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented.

For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4:
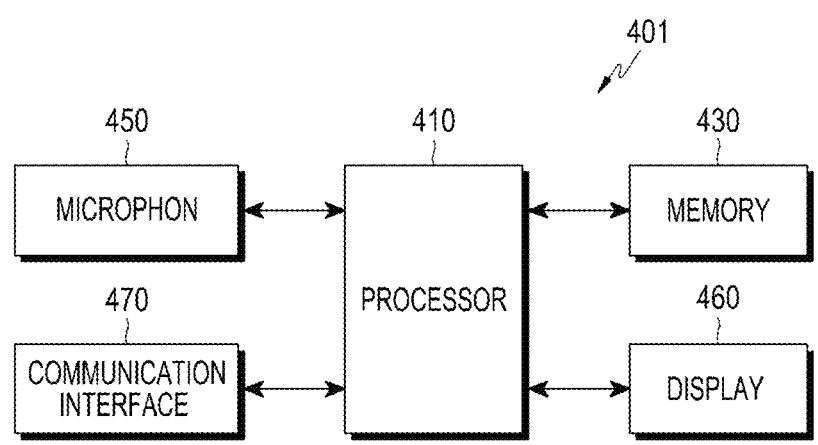
FIG. 4 is a block diagram illustrating the configuration of an electronic device according to various embodiments of the present disclosure.

FIG. 4 is a block diagram illustrating the configuration of an electronic device according to various embodiments of the present disclosure.

Referring to FIG. 4, the electronic device 401 according to various embodiments of the present disclosure may include, for example, the entirety or part of the electronic device 101 illustrated in FIG. 1 and may include a processor 410, a memory 430, a microphone 450, a display 460, and a communication interface 470.

According to various embodiments, the processor 410 may be the processor 120 illustrated in FIG. 1. The processor 410 may include one or more of a Central Processing Unit (CPU), an Application Processor (AP), and a Communication Processor (CP). The processor 410 may process at least some of information obtained from other components of the electronic device 401 (for example, the memory 430, the microphone 450, the display 450, and the communication interface 470) and may provide the information to a user by various methods. According to various embodiments of the present disclosure, the processor 410 may control all the components of the electronic device 401.

According to various embodiments, the processor 410 may receive content including at least one object. The content may include a standardized document in at least one of a Hypertext Markup Language (HTML), an Extensible Markup Language (XML), and a GUI toolkit (EFL-EDJE or the like). The processor 410 may analyze resources of the received content. For example, the processor 410 may analyze the standardized document included in the content and may distinguish at least one object according to the tag type. The at least one object may include at least one of a content title, an image title, a text icon, an image icon, a text content, an image content, a link content, and an input area which are displayed on a content page. The processor 410 may also determine whether the at least one object is related to a text. For example, when the object is an object including a text, such as a content title, an image title, a text icon, a text content, and a link content, the processor 410 may determine that the object is a text object. When the object is an object not including a text, such as an image icon, an image content, or an input area, the processor 410 may determine that the object is a non-text object.

According to various embodiments, when there is a non-text object that is not related to a text, the processor 410 may assign an instruction text to the non-text object. The instruction text may enable the non-text object to be identified by the user's voice recognition. In addition, the processor 410 may configure a content page such that the instruction text is located corresponding to the object. The processor 410 may edit the standardized document in the content so that the instruction text may be represented on the content page displayed on the display. The instruction text may be displayed in a tooltip format. In addition, the processor 410 may control the display 460 to display the configured content page.

According to various embodiments, the processor 410 may receive an audio signal from the microphone 450 and may recognize a voice from the received audio signal. For example, the processor 410 may convert the audio signal from the microphone 450 into a text and may recognize the converted text. The processor 410 may determine whether the text corresponding to the recognized voice is related to at least one object in the content page. When the text corresponding to the recognized voice is related to the at least one object, the processor 410 may select the related object. For example, the processor 410 may determine whether a text object including the entirety or at least some of the text corresponding to the recognized voice is present in the content page. When there is a text object including the text corresponding to the recognized voice, the processor 410 may select the text object as an object related to the audio signal. Alternatively, the processor 410 may determine whether an instruction text including the entirety or at least some of the text corresponding to the recognized voice is present in the content page. When there is an instruction text including the text corresponding to the recognized voice, the processor 410 may select a non-text object corresponding to the instruction text as an object related to the audio signal. In addition, when the related object is selected, the processor 410 may perform an operation matching the object. For example, when the related object is any one of a content title, an image title, a text icon, an image icon, a text content, an image content, and a link content, the processor 410 may access content corresponding to the object. Further, when the related object is an input area, the processor 410 may support voice input according to the selection of the input area.

According to various embodiments, when the text corresponding to the recognized voice is related to a plurality of objects in the content page, the processor 410 may assign an index text to the plurality of related objects. The index text may enable the plurality of objects to be identified by the user's voice recognition. In addition, the processor 410 may configure a content page such that the index text is located corresponding to each object. The processor 410 may edit the standardized document in the content so that the index text may be represented on the content page displayed on the display. The index text may be displayed in a tooltip format.

In addition, the processor 410 may control the display 460 to display the configured content page. In various embodiments, when the text corresponding to the recognized voice is related to a plurality of objects in the content page, the processor 410 may display an instruction text "cancel" for canceling an audio signal related to the plurality of objects in a tooltip format on the content page displayed on the display so that the user can input an audio signal including another non-overlapping text.

According to various embodiments, when there is an object related to a text language different from a text language corresponding to the recognized voice, the processor 410 may assign an instruction text to the object related to the different text language. In addition, the processor 410 may configure a content page such that the instruction text is located corresponding to the object related to the different text language, and may control the display 460 to display the configured content page.

According to various embodiments, the memory 430 may be the memory 130 illustrated in FIG. 1. The memory 430 may store a command or data related to at least one other component of the electronic device 401. The memory 430 may store a signal or data that is input/output corresponding to the operations of the processor 410, the microphone 450, the display 460, and the communication interface 470 under the control of the processor 410.

According to various embodiments, the microphone 450 may be a part of the input/output interface 150 illustrated in FIG. 1. The microphone 450 may obtain a voice or sound. The microphone 450 may be always turned on according to the operation or may be turned on in response to input or depending on conditions.

According to various embodiments, the display 460 may be the display 160 illustrated in FIG. 1. The display 460 may display a content page configured by the processor 410.

According to various embodiments, the communication interface 470 may be the communication interface 170 illustrated in FIG. 1. The communication interface 470 may connect a session for communication with an external electronic device and may communicate data. The communication interface 470 may receive content from an external electronic device.

According to various embodiments of the present disclosure, an electronic device may include: a display; and a processor, wherein the processor may be configured to: obtain content including at least one object; distinguish the at least one object within the content; display an instruction text corresponding to a non-text object among the at least one object; and select the non-text object corresponding to the instruction text when a voice command corresponding to the instruction text is input.

According to various embodiments of the present disclosure, the processor may be configured to: analyze a resource of the content; distinguish the at least one object within the content on the basis of an analysis result; assign the instruction text to a non-text object when the at least one object includes the non-text object; and configure a content page such that the instruction text is located corresponding to the non-text object to display the content page on the display.

According to various embodiments of the present disclosure, the content may include a standardized document in at least one of a Hypertext Markup Language (HTML), an Extensible Markup Language (XML), and a GUI toolkit (EFL-EDJE).

According to various embodiments of the present disclosure, the at least one object may include at least one of a content title, an image title, a text icon, an image icon, a text content, an image content, a link content, and an input area which are displayed on the content page.

According to various embodiments of the present disclosure, the instruction text may be displayed in a tooltip format.

According to various embodiments of the present disclosure, the electronic device may include a microphone configured to receive an audio signal from a user, wherein the processor may be configured to: recognize a voice from the audio signal from the microphone; determine whether a text corresponding to the recognized voice is related to at least one object in a content page; and select the related object when the text is related to the at least one object. Further, the processor may be configured to perform an operation matching the selected object. Further, the processor may be configured to support voice input when the selected object is an input area.

According to various embodiments of the present disclosure, when the text corresponding to the recognized voice is related to a plurality of objects in the content page, the processor may be configured to: assign an index text to the plurality of related objects; and configure a content page such that the index text is located corresponding to the plurality of related objects to display the content page on the display.

According to various embodiments of the present disclosure, when there is an object related to a text language different from a text language corresponding to the recognized voice, the processor may be configured to: assign an instruction text to the object related to the different text language; and configure a content page such that the instruction text is located corresponding to the object related to the different text language to display the content page on the display.

Figure 5:
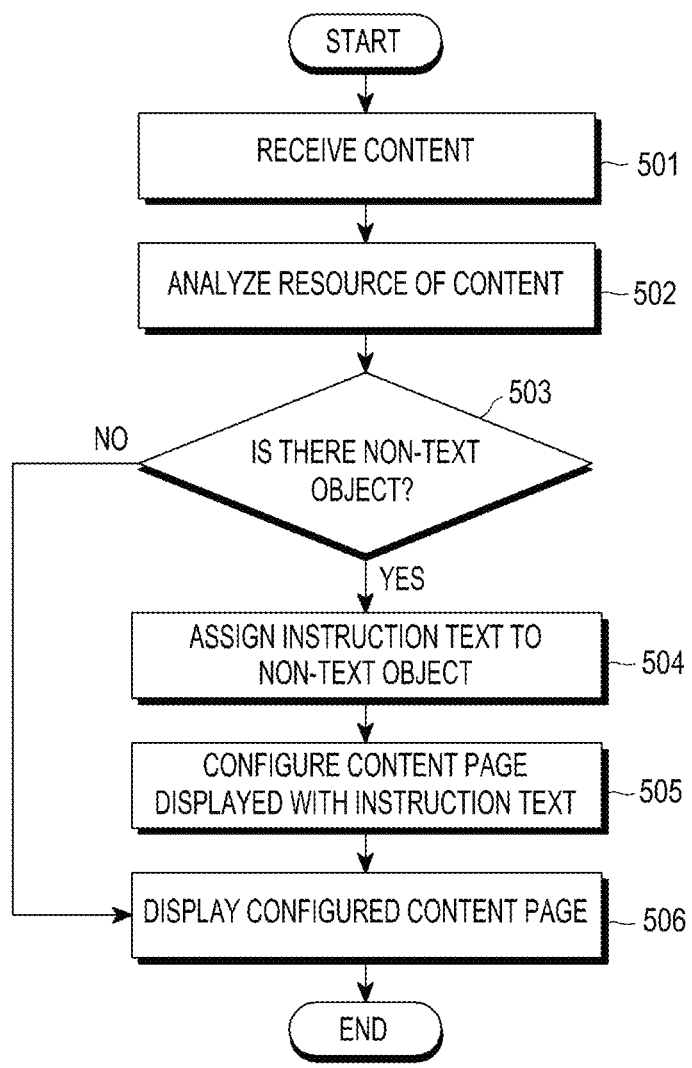
FIG. 5 is a flowchart illustrating a method for an electronic device to display a content page according to various embodiments of the present disclosure.
Figure 6A:

FIG. 5 is a flowchart illustrating a method for an electronic device to display a content page according to various embodiments of the present disclosure, and FIGS. 6A and 6B show examples for illustrating a method for an electronic device to display a content page according to various embodiments of the present disclosure.

Hereinafter, a method for an electronic device to display a content page according to various embodiments of the present disclosure will be described with reference to FIGS. 5, 6A, and 6B.

In operation 501, an electronic device (for example, the communication interface 470) may receive content from an external electronic device. Alternatively, the electronic device (for example, the processor 410) may receive content stored in the memory 430. The content may include at least one standardized document of a Hypertext Markup Language (HTML), an Extensible Markup Language (XML), and a GUI toolkit (EFL-EDJE).

In operation 502, the electronic device (for example, the processor 410) may analyze resources of the content. For example, the electronic device may analyze the standardized document included in the content and may distinguish at least one object according to the tag type. The at least one object may include at least one of a content title, an image title, a text icon, an image icon, a text content, an image content, a link content, and an input area which are displayed on a content page.

In operation 503, the electronic device (for example, the processor 410) may determine whether there is a non-text object among the at least one object on the basis of the result of analyzing the resources of the content. For example, when the object is an object including a text, such as a content title, an image title, a text icon, a text content, and a link content, the electronic device may determine that the object is a text object. When the object is an object including no text, such as an image icon, an image content, and an input area, the electronic device may determine that the object is a non-text object.

In operation 504, when there is a non-text object, the electronic device (for example, the processor 410) may assign an instruction text to the non-text object. The instruction text may enable the non-text object to be identified by a user's voice recognition.

In operation 505, the electronic device (for example, the processor 410) may configure a content page such that the instruction text is located corresponding to the object. For example, the electronic device may edit the standardized document in the content so that the instruction text may be represented on the content page displayed on a display. The instruction text may be displayed in a tooltip format.

In operation 506, the electronic device (for example, the processor 410) may display the configured content page on the display.

A method for an electronic device to display a content page according to various embodiments of the present disclosure may provide a content page screen 610a, as shown in FIG. 6A. The content page screen 610a may be a web page providing a search function. The electronic device may analyze standardized document resources constituting the web page and may divide the web page according to the tag type into a link object 620 that provides an access path to the web page, an input area object 630 that provides an input area, an input tool object 640 that provides a virtual keyboard, and a voice search object 650 that provides a voice input function. The link object 620, the input area object 630, the input tool object 640, and the voice search object 650 are objects not including any text, and each object may be assigned an instruction text (for example, 1, 2, 3, and 4). For example, on the content page screen 610a illustrated in FIG. 6A, instruction texts (for example, 1, 2, 3, and 4) may be displayed in a tooltip format at positions corresponding to the link object 620, the input area object 630, the input tool object 640, and the voice search object 650.

Alternatively, as shown in FIG. 6B, a content page screen 610b may be provided. The content page screen 610b may be a web page that provides search results. The electronic device may analyze standardized document resources constituting the web page and may divide the web page according to the tag type into a text object 680 that provides a search result title and brief information in a text format and an image object 670 that provides an image content. The text object 680 is a text-related object and may not be assigned an instruction text. The image object 670 is an object not including any text, and each object may be assigned an instruction text (for example, 1, 2, 3, 4, and 5). For example, on the content page screen 610b illustrated in FIG. 6B, an instruction text (for example, 1, 2, 3, 4, and 5) may be displayed in a tooltip format at a position corresponding to each image object 670.

Figure 7:
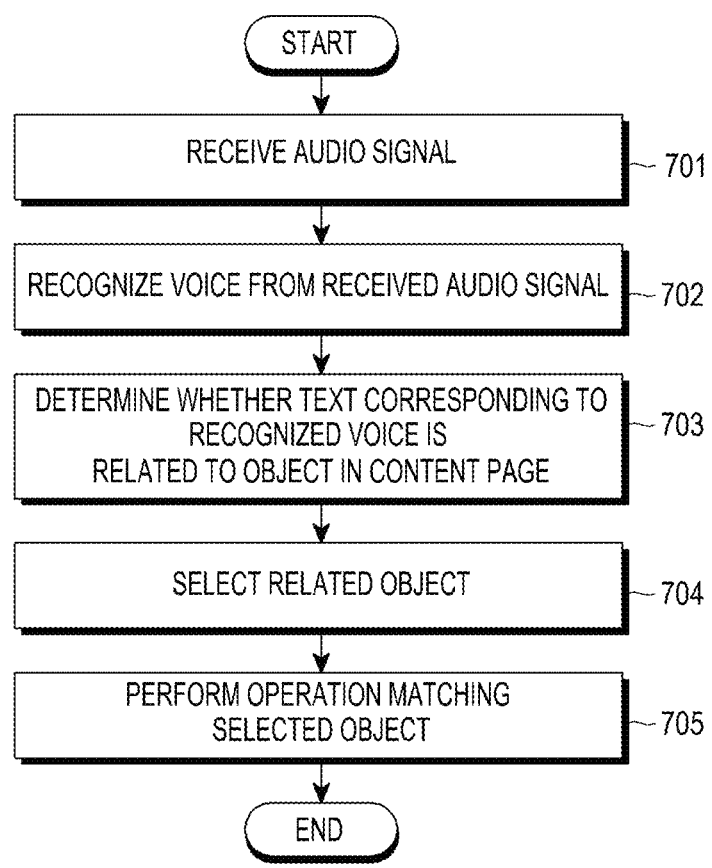
FIG. 7 is a flowchart illustrating a voice recognition control method of an electronic device according to various embodiments of the present disclosure.
Figure 8B:
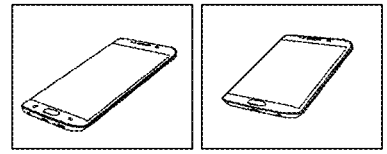

FIG. 7 is a flowchart illustrating a voice recognition control method of an electronic device according to various embodiments of the present disclosure, and FIGS. 8A and 8B show examples for illustrating a voice recognition control method of an electronic device according to various embodiments of the present disclosure.

Hereinafter, a voice recognition control method of an electronic device according to various embodiments of the present disclosure will be described with reference to FIGS. 7, 8A, and 8B.

In operation 701, an electronic device (for example, the processor 410) may receive an audio signal from the microphone 450. For example, when content including at least one object is received and an application (for example, a web browser) that displays the received content on a content page is executed, the electronic device may provide a voice recognition control function and may receive an audio signal. Alternatively, when content including at least one object is received, an application (for example, a web browser) that displays the received content on a content page is executed, and a voice recognition control function is requested by a user, the electronic device may provide the voice recognition control function in response to the request from the user and may receive an audio signal. In various embodiments, when the voice recognition control function is provided, the electronic device may analyze resources of the received content and may display a content page on which an instruction text is assigned to a non-text object on a display.

In operation 702, the electronic device (for example, the processor 410) may recognize a voice from the received audio signal. For example, the electronic device may convert the audio signal from the microphone into a text and may recognize the converted text.

In operation 703, the electronic device (for example, the processor 410) may determine whether the text corresponding to the recognized voice is related to an object in the content page.

In operation 704, when the text corresponding to the recognized voice is related to an object in the content page, the electronic device (for example, the processor 410) may select the related object.

In operation 705, the electronic device (for example, the processor 410) may perform an operation matching the selected object. For example, when the related object is a text object, such as a content title, the electronic device may access content corresponding to the text object. Alternatively, when the related object is an image object that provides an image content, the electronic device may provide an image content corresponding to the image object. Alternatively, when the related object is an input area object, the electronic device may support voice input in response to selection of an input area.

A voice recognition control method of an electronic device according to various embodiments of the present disclosure may provide a content page screen 810a, as shown in FIG. 8A. The content page screen 810a may be a web page providing search results. The electronic device may receive an audio signal from the microphone 450 and may recognize a voice from the received audio signal. The electronic device may determine whether a text corresponding to the recognized voice is related to at least one object in a content page. For example, when the text corresponding to the recognized voice is "edge", the electronic device may display 881 the selection of an object related to "edge" on the content page screen 810a illustrated in FIG. 8A. Further, the electronic device may perform an operation of accessing content of the object simultaneously with the selection of the object related to "edge".

Alternatively, as illustrated in FIG. 8B, a content page screen 810b may be provided. The content page screen 810b may be a web page that provides search results. The electronic device may receive an audio signal from the microphone 450 and may recognize a voice from the received audio signal. The electronic device may determine whether a text corresponding to the recognized voice is related to an instruction text (for example, 1, 2, 3, 4, and 5 illustrated in FIG. 6B) in a content page. For example, when the text corresponding to the recognized voice is a number "5" on the content page screen 810*b* illustrated in FIG. 8B, the electronic device may display 871 the selection of an object corresponding to an instruction text related to "5". Further, the electronic device may perform an operation of providing an image content of the object simultaneously with the selection of the object corresponding to the instruction text related to "5".

Figure 9:
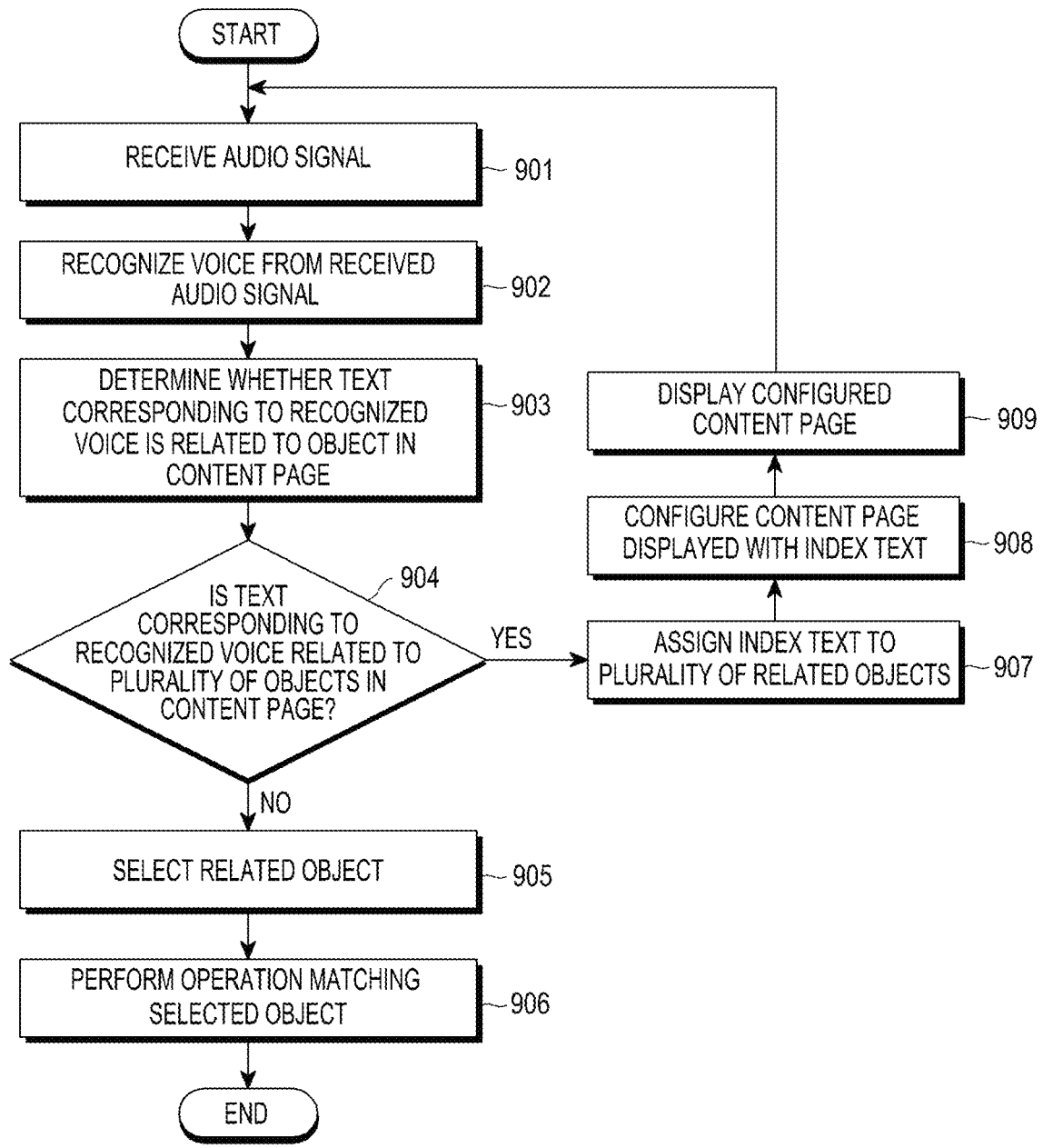
FIG. 9 is a flowchart illustrating a method in which an electronic device controls voice recognition and displays a content page according to various embodiments of the present disclosure.
Figure 10A:
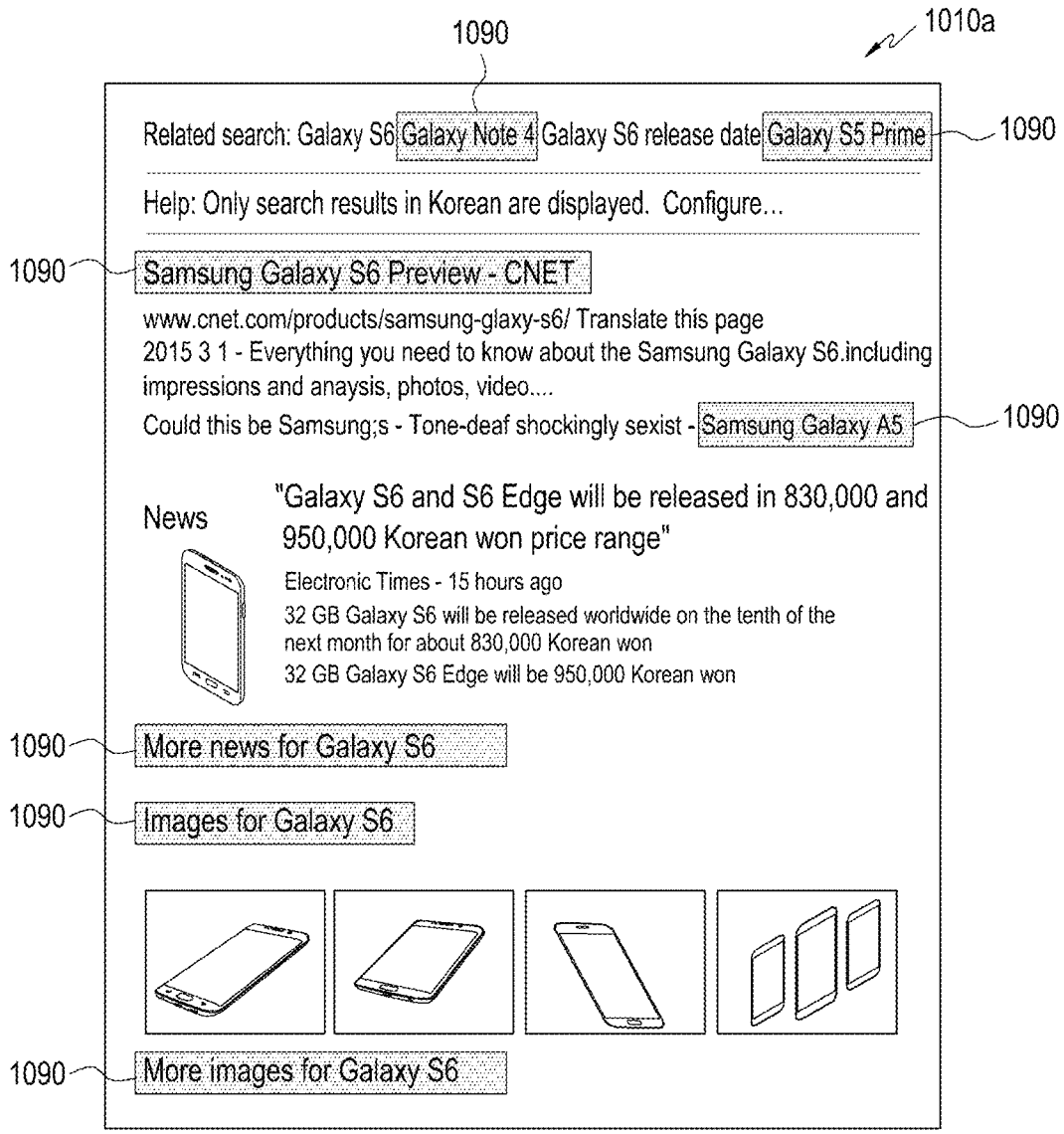
FIGS. 10A and 10B show examples for illustrating a method in which an electronic device controls voice recognition and displays a content page according to various embodiments of the present disclosure.
Figure 10B:
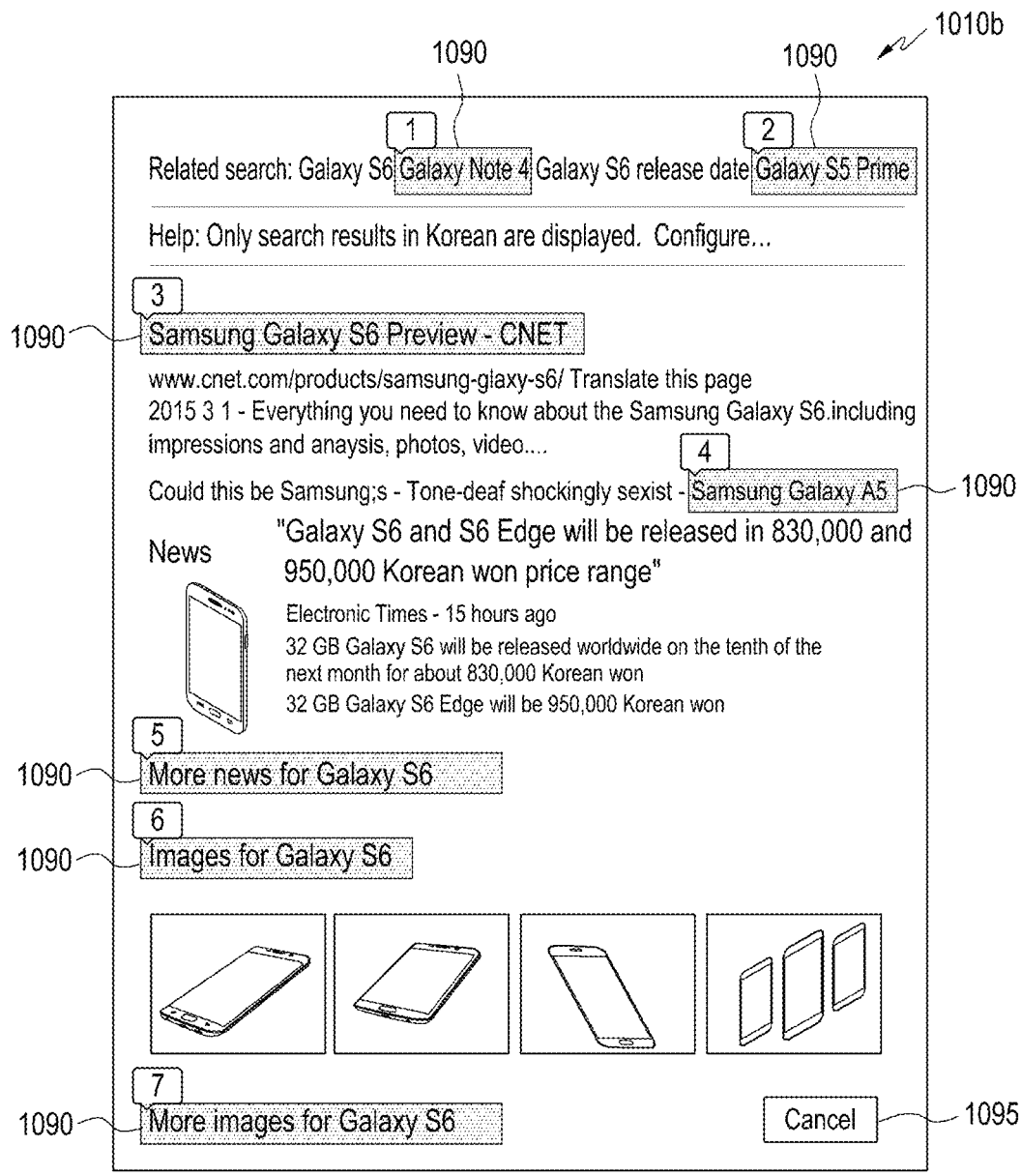

FIG. 9 is a flowchart illustrating a method in which an electronic device controls voice recognition and displays a content page according to various embodiments of the present disclosure, and FIGS. 10A and 10B show examples for illustrating a method in which an electronic device controls voice recognition and displays a content page according to various embodiments of the present disclosure.

Hereinafter, a method in which an electronic device controls voice recognition and displays a content page according to various embodiments of the present disclosure will be described with reference to FIGS. 9, 10A, and 10B.

In operation 901, an electronic device (for example, the processor 410) may receive an audio signal from the microphone 450. For example, when content including at least one object is received and an application (for example, a web browser) that displays the received content on a content page is executed, the electronic device may provide a voice recognition control function and may receive an audio signal. Alternatively, when content including at least one object is received, an application (for example, a web browser) that displays the received content on a content page is executed, and a voice recognition control function is requested by a user, the electronic device may provide the voice recognition control function in response to the request from the user and may receive an audio signal. In various embodiments, when the voice recognition control function is provided, the electronic device may analyze resources of the received content and may display a content page on which an instruction text is assigned to a non-text object on a display.

In operation 902, the electronic device (for example, the processor 410) may recognize a voice from the received audio signal. For example, the electronic device may convert the audio signal from the microphone into a text and may recognize the converted text.

In operation 903, the electronic device (for example, the processor 410) may determine whether the text corresponding to the recognized voice is related to an object in the content page.

In operation 904, the electronic device (for example, the processor 410) may determine whether the text corresponding to the recognized voice is related to a plurality of objects in the content page.

In operation 905, when the text corresponding to the recognized voice is related to one object, the electronic device (for example, the processor 410) may select the related object.

In operation 906, the electronic device (for example, the processor 410) may perform an operation matching the selected object.

In operation 907, when the text corresponding to the recognized voice is related to a plurality of objects, the electronic device (for example, the processor 410) may assign an index text to the plurality of related objects. The index text may enable the plurality of objects to be identified by the user's voice recognition.

In operation 908, the electronic device (for example, the processor 410) may configure a content page such that the index text is located corresponding to each object. For example, the electronic device may edit a standardized document of the content so that the index text may be represented on the content page displayed on the display. The index text may be displayed in a tooltip format.

In operation 909, the electronic device (for example, the processor 410) may display the configured content page on the display.

A method in which an electronic device controls voice recognition and displays a content page according to various embodiments of the present disclosure may provide a content page screen 1010*a*, as shown in FIG. 10A. The content page screen 1010*a* may be a web page providing search results. The electronic device may receive an audio signal from the microphone 450 and may recognize a voice from the received audio signal. The electronic device may determine whether a text corresponding to the recognized voice is related to a plurality of objects in a content page. For example, when the text corresponding to the recognized voice is "galaxy", the electronic device may display 1090 the selection of a plurality of objects related to "galaxy" on the content page screen 1010*a* illustrated in FIG. 10A.

As illustrated in FIG. 10B, on a content page screen 1010*b*, an index text (for example, 1, 2, 3, 4, 5, 6, and 7) may be assigned to each of the plurality of objects 1090 related to "galaxy", and the index text (for example, 1, 2, 3, 4, 5, 6, and 7) may be displayed in a tooltip format at a position corresponding to each object.

Further, as illustrated in FIG. 10B, on the content page screen 1010*b*, an instruction text "cancel" 1095 for canceling an audio signal related to the plurality of objects 1090 may be displayed in a tooltip format on the content page displayed on the display so that the user can input an audio signal including another non-overlapping text.

In addition, as illustrated in FIG. 10B, when there is an object related to a text language (for example, Korean) different from a text language (for example, English) corresponding to the recognized voice, the object is not selected, in which case the electronic device may assign a new instruction text to the object related to the different text language.

According to various embodiments of the present disclosure, an operating method of an electronic device may include: obtaining content including at least one object; distinguishing the at least one object within the content; displaying an instruction text corresponding to a non-text object among the at least one object; and selecting the non-text object corresponding to the instruction text when a voice command corresponding to the instruction text is input.

According to various embodiments of the present disclosure, the operating method may further include: analyzing a resource of the content; distinguishing the at least one object within the content on the basis of an analysis result; assigning the instruction text to a non-text object when the at least one object includes the non-text object; and configuring and displaying a content page such that the instruction text is located corresponding to the non-text object.

According to various embodiments of the present disclosure, the content may include a standardized document in at least one of a Hypertext Markup Language (HTML), an Extensible Markup Language (XML), and a GUI toolkit.

According to various embodiments of the present disclosure, the at least one object may include at least one of a content title, an image title, a text icon, an image icon, a text content, an image content, a link content, and an input area which are displayed on the content page.

According to various embodiments of the present disclosure, the instruction text may be displayed in a tooltip format.

According to various embodiments of the present disclosure, the operating method may further include: receiving an audio signal from a user; recognizing a voice from the received audio signal; determining whether a text corresponding to the recognized voice is related to at least one object in a content page; and selecting the related object when the text is related to the at least one object. Further, the operating method may further include performing an operation matching the selected object. In addition, when the selected object is an input area, the operating method may further include supporting voice input.

According to various embodiments of the present disclosure, when the text corresponding to the recognized voice is related to a plurality of objects in the content page, the operating method may further include assigning an index text to the plurality of related objects, and configuring and displaying a content page such that the index text is located corresponding to the plurality of related objects.

According to various embodiments of the present disclosure, when there is an object related to a text language different from a text language corresponding to the recognized voice, the operating method may further include assigning an instruction text to the object related to the different text language, and configuring and displaying a content page such that the instruction text is located corresponding to the object related to the different text language.

According to various embodiments of the present disclosure, a computer recording medium may store an instruction that is executed by at least one processor and is readable by a computer, wherein the instruction may be configured to perform: obtaining content including at least one object; distinguishing the at least one object within the content; displaying an instruction text corresponding to a non-text object among the at least one object; and selecting the non-text object corresponding to the instruction text when a voice command corresponding to the instruction text is input.

Embodiments of the present disclosure illustrated in the present specification and the drawings are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure in addition to the embodiments disclosed herein.

According to various embodiments of the present disclosure, it is possible to provide voice recognition control that enables the selection and execution of a particular object only using voice recognition, without any input tool, by analyzing a resource of content configured with part of a standardized document, such as a web page or a GUI toolkit (FEL-EDJE or the like), and by displaying an object, which is not selectable by voice recognition, with an assigned instruction text.

What is claimed is:

1. A non-transitory computer-readable medium storing instructions which, when executed by at least one processor of an electronic device, cause the electronic device to perform operations comprising:
displaying, on a display of the electronic device, a screen including objects;
receiving, via a microphone of the electronic device, a first audio signal while the screen is displayed on the display;
recognizing the first audio signal;
obtaining text based on a recognition result of the first audio signal; and
based on identifying, from among the objects, a plurality of the objects, each of which includes text which corresponds to the text obtained from the recognition result of the first audio signal,
displaying, on the display, the identified plurality of objects and a plurality of indices, wherein the plurality of indices are different from each other and are disposed on the screen at positions in correspondence with the identified plurality of objects;
receiving, via the microphone, a second audio signal while the plurality of objects and the plurality of indices are displayed;
recognizing the second audio signal; and
based on identifying that a recognition result of the second audio signal corresponds to one index among the plurality of indices, performing an operation associated with an object corresponding to the one index from among the plurality of objects,
wherein the operation associated with the object comprises displaying, on the display, another screen different from the screen.

2. The non-transitory computer-readable medium according to claim 1, wherein the electronic device comprises one of a mobile phone, a tablet computer, a laptop computer, a desktop computer or a television.

3. The non-transitory computer-readable medium according to claim 1, wherein the operations further comprise:
based on identifying one object of the objects as including text which corresponds to the text obtained from the recognition result of the first audio signal,
selecting the one object; and
performing an operation associated with the selected object.

4. The non-transitory computer-readable medium according to claim 1, wherein each of the plurality of indices comprises numeric-related text.

5. The non-transitory computer-readable medium of claim 1, wherein the screen comprises a screen of a web browser.

6. A method for an electronic device, the method comprising:
displaying, on a display of the electronic device, a screen including objects;
receiving, via a microphone of the electronic device, a first audio signal while the screen is displayed on the display;
recognizing, by a processor of the electronic device, the first audio signal;
obtaining, by the processor, text based on a recognition result of the first audio signal; and
based on identifying, from among the objects, a plurality of the objects, each of which includes text which corresponds to the text obtained from the recognition result of the first audio signal,
displaying, on the display, the identified plurality of objects and a plurality of indices, wherein the plurality of indices are different from each other and are disposed on the screen at positions in correspondence with the identified plurality of objects;
receiving, via the microphone, a second audio signal while the plurality of objects and the plurality of indices are displayed;

recognizing, by the processor, the second audio signal; and based on identifying, by the processor, that a recognition result of the second audio signal corresponds to one index among the plurality of indices, performing, by the processor, an operation associated with an object corresponding to the one index from among the plurality of objects, wherein the operation associated with the object comprises displaying, on the display, another screen different from the screen.

7. The method of claim 6, wherein the electronic device comprises one of a mobile phone, a tablet computer, a laptop computer, a desktop computer or a television.

8. The method of claim 6, further comprising:

based on identifying one object of the objects as including text which corresponds to the text obtained from the recognition result of the first audio signal, selecting the one object; and performing an operation associated with the selected object.

9. The method of claim 6, wherein each of the plurality of indices comprises numeric-related text.

10. The method of claim 6, wherein the screen comprises a screen of a web browser.

11. An electronic device comprising:

communication circuitry;

a microphone;

a display;

a processor; and memory storing instructions that, when executed by the processor, cause the electronic device to:

display, on a display of the electronic device, a screen including objects;

receive, via a microphone of the electronic device, a first audio signal while the screen is displayed on the display;

recognize the first audio signal;

obtain text based on a recognition result of the first audio signal; and based on identifying, from among the objects, a plurality of the objects, each of which includes text which corresponds to the text obtained from the recognition result of the first audio signal, display, on the display, the identified plurality of objects and a plurality of indices, wherein the plurality of indices are different from each other and are disposed on the screen at positions in correspondence with the identified plurality of objects;

receive, via the microphone, a second audio signal while the plurality of objects and the plurality of indices are displayed;

recognize the second audio signal; and based on identifying that a recognition result of the second audio signal corresponds to one index among the plurality of indices, perform an operation associated with an object corresponding to the one index from among the plurality of objects, wherein the operation associated with the object comprises displaying, on the display, another screen different from the screen.

12. The electronic device of claim 11, wherein the electronic device comprises one of a mobile phone, a tablet computer, a laptop computer, a desktop computer or a television.

13. The electronic device of claim 11, wherein the instructions, when executed by the processor, cause the electronic device to:

based on identifying one object of the objects as including text which corresponds to the text obtained from the recognition result of the first audio signal, select the one object; and perform an operation associated with the selected object.

14. The electronic device of claim 11, wherein each of the plurality of indices comprises numeric-related text.

15. The electronic device of claim 11, wherein the screen comprises a screen of a web browser.

\* \* \* \* \*